United States Patent [19]

Lipowski

[11] 4,414,034

[45] Nov. 8, 1983

[54] NOVEL ADDITIVE BLENDS FOR CEMENTITIOUS MATERIALS

[75] Inventor: Stanley A. Lipowski, Livingston, N.J.

[73] Assignee: Diamond Shamrock Corporation, Dallas, Tex.

[21] Appl. No.: 399,758

[22] Filed: Jul. 19, 1982

[51] Int. Cl.$^3$ .............................................. C04B 7/35
[52] U.S. Cl. ...................................... 106/90; 106/314
[58] Field of Search ................................. 106/90, 314

[56] References Cited

U.S. PATENT DOCUMENTS

| | | | |
|---|---|---|---|
| 2,141,569 | 12/1938 | Tucker | 106/90 |
| 3,216,966 | 11/1965 | Collins et al. | 106/90 |
| 3,415,773 | 12/1968 | Collins et al. | 106/90 |
| 3,415,774 | 12/1968 | Hood et al. | 106/90 |
| 3,537,869 | 11/1970 | Proell | 106/95 |

OTHER PUBLICATIONS

CA 75 51101q.

*Primary Examiner*—James Poer
*Attorney, Agent, or Firm*—Neal T. Levin

[57] ABSTRACT

Additives for cementitious materials are formed from mixtures of (1) salts of naphthalene or lower alkyl substituted naphthalene sulfonic acid formaldehyde condensates and (2) water-soluble resins selected from the group consisting of resorcinol-formaldehyde and catechol-formaldehyde resins. Addition of these mixtures to cementitious materials results in improved slump and compressive strength.

12 Claims, No Drawings

NOVEL ADDITIVE BLENDS FOR CEMENTITIOUS MATERIALS

BACKGROUND OF THE INVENTION

1. Field of the Invention

This invention relates to additives which improve the compressive strength and workability of cementitious compositions such as cement, cement slurries, mortar, grout and concrete.

2. Description of the Prior Art

Concrete is a hard, strong building material made by mixing cement, sand, gravel and water. Water in the mixture causes the cement to set and bind the entire mixture in a hard mass. It is well known in concrete technology that the strength—usually the compressive strength as measured by the ASTM test C39-72—is a reliable criterion of general quality. For this reason, the whole technology of concrete is developed around obtaining a significant and practical strength with a minimum of cost, and a maximum of convenience in use. Despite extensive research, most of the concrete presently being used are simple mixtures of sand and coarse stone containing a minor proportion of portland cement with sufficient water being added to produce a mixture fluid enough to place in forms.

It is well known in the art that reducing water in concrete increases the compressive strength and other properties as well. Considerable research has been directed to discovering mixtures of different particle sizes of sand and stone which will give fluid concrete having minimum water content. Also, various organic and inorganic additives have been found which permit reduction in the water content of concrete. One such additive, the sodium salt of naphthalene sulfonic acid formaldehyde condensate is used commercially for this purpose. This additive also increases the strength of hardened concrete. See U.S. Pat. No. 2,141,569—Tucker—Dec. 27, 1938.

Further, U.S. Pat. No. 3,537,869—Proell—Nov. 3, 1970 describes use of additives containing sulfonated condensation products of formaldehyde and naphthalene or salts thereof in combination with lecithin, partial fatty acid esters of polyols, their ethoxylates, sulfates, etc., in concrete mixes to increase compressive strength of the hardened concrete.

Additionally, use of resorcinol-formaldehyde and catechol-formaldehyde resin in cement and concrete is shown below.

U.S. Pat. No. 3,216,966—Collins et al—Nov. 9, 1965 describes an ultra high strength concrete composition containing an in situ cross-linked condensation product of resorcinol or phloroglucinol and formaldehyde or glyoxal.

CA 75 51101q describes an oil well plugging mixture composed of portland cement and 15% phenolic resin, e.g., resorcinol-formaldehyde resin, hardened with formalin or paraformaldehyde.

SUMMARY OF THE INVENTION

Mixtures or blends of (1) at least one water-soluble resin selected from the group consisting of resorcinol-formaldehyde and catechol-formaldehyde resins and (2) one or more salts of naphthalene or lower alkyl (e.g. methyl and ethyl) substituted naphthalene sulfonic acid formaldehyde condensates added to concrete mixes and other cementitious materials act to reduce the water required for good workability and result in cementitious compositions such as cement, cement slurries, mortar, grout and concrete of increased compressive strength. The blends may be added at any point during the preparation of the cementitious material and may be added in liquid or solid form depending on when it is introduced. The blends are added in effective amounts to reduce the water content and to bring about increased compressive strength of the hardened product. For example, from about 0.05% to about 5.0% by weight of the blends, based on the weight of the cement component, may be used in concrete mixes. In the blends, the percent by weight of the salts of aromatic sulfonic acid formaldehyde condensates can vary from about 50.0% to about 95.0% while the percent by weight of the resin can vary from about 5.0% to about 50.0%.

DESCRIPTION OF THE PREFERRED EMBODIMENTS

It was unexpectedly found that when at least one water-soluble resin selected from the group consisting of resorcinol-formaldehyde and catechol-formaldehyde resins were blended with salts of naphthalene or lower alkyl substituted naphthalene sulfonic acid formaldehyde condensates and the mixture added to mortar or concrete, compressive strengths higher than the commercial additive alone resulted. Furthermore, the mixtures resulted in better slump than the commercial superplasticizer alone.

RESIN

The resins are one or a mixture of water-soluble resorcinol-formaldehyde and catechol-formaldehyde resin. These resins are prepared by condensing the resorcinol, catechol or mixture of both with formaldehyde in a mole ratio of from about 1.3 to about 1.7 moles of resorcinol, catechol or both per mole of formaldehyde, usually in the presence of acid, such as sulfuric acid, as catalyst. Reaction occurs at elevated temperatures.

Naphthalene Sulfonic Acid Formaldehyde Condensate

The commercial superplasticizer, the sodium salt of naphthalene sulfonic acid formaldehyde condensate was found to be the preferred aromatic sulfonic acid formaldehyde condensate effective in the blend. Although the preferred form of these condensates is their sodium salt, they can be used in the form of other salts such as the calcium, potassium, zinc, aluminum, magnesium, maganese, ferrous, ferric and ammonium salts. Amine salts can be used such as the methylamine, dimethylamine, ethanolamine and diethanol- amine salts. These condensates may be prepared by reacting a mixture of naphthalene or lower alkyl substituted naphthalene such as methyl or ethyl naphthalene with formaldehyde and sulfuric acid. Useful processes are described in U.S. Pat. No. 2,141,569—Tucker et al—Dec. 27, 1938; U.S. Pat. No. 3,193,575—Nebel et al—July 6, 1965 and U.S. Pat. No. 3,277,162—Johnson—Oct. 4, 1966.

Naphthalene sulfonic acid formaldehyde condensate is a mixture of condensation products of naphthalenesulfonic acid and formaldehyde. It can be chromatographed by size exclusion chromatography through a column containing pore sizes which selectively separate molecular volumes according to size. The solvent chosen for the acid in chromatography should minimize solute-packing interaction and solute-solute interaction. The chromatogram gives a true molecular volume profile when the eluents are displayed on a detector-strip chart recorder display. The chromatogram for a sample of the sulfonic acid used in the examples is the same as that for the sodium naphthaleneformaldehyde sulfonate in U.S. Pat. No. 3,954,491—Adrian et al—May 4, 1976, and the two anionic materials are identical. That is, the anionic materials from the acid have the same profile as the anionic materials from the sodium naphthaleneformaldehyde sulfonate having lowest elution volumes of from above 61 to about 70% of the total elution volume and equivalent elution volumes of from about 61 to about 70% of the total elution volume. The teachings in U.S. Pat. No. 3,954,491 relating to chromatography are incorporated by reference herein. This chromatographic method was described by Dr. Harold Edelstein in a paper entitled, "Aqueous Gel Permeation Chromatograph of Some Naphthalene Sulfonic Acid Formaldehyde Condensates" presented at the Mini Symposium of the North Jersey Chromatography Group Subsection of the A.C.S. on Mar. 6, 1978 at Hoffman La Roche Auditorium, Clifton N.J.

The ratio of superplasticizer and resin varies depending on the combination used. But in general, the superplasticizer, i.e., the sodium salt and other salts of aromatic sulfonic acid formaldehyde condensate exhibit improvement when used with the resin in the range of about 50% to about 95% by weight aromatic sulfonic acid formaldehyde condensate with about 5.0% to about 50% by weight of resin. It has been found that the ratio can be adjusted to give optimum workability and high compressive strength.

Cementitious Materials

The cementitious materials are cement slurries, mortar, grout and concrete, all of which are well-known in the art. The cements used in the preparation of the concrete mixes include Type I, II and III cements and Type H cement which is used in cement slurries for oil well cementing applications. The properties of the cements are well known and are described in the Portland Cement Association Engineering Bulletin entitled, "Design and Control of Concrete Mixtures", Twelfth Edition, 1979, and "Kirk Othmer Encyclopedia of Chemical Technology," Second Edition (Interscience Publishers, N.Y., N.Y. 1967), Volume 4, pages 690-692. The teachings as to the properties of these cements are disclosed in these publications and are incorporated by reference herein.

These cements may be used to prepare concrete mixes containing 100 parts by weight of cement, from about 140 to about 260 parts by weight of sand, from about 100 to about 200 parts by weight of gravel and from about 35 to about 60 parts by weight of water, with the preferred concrete mixes containing 100 parts by weight of cement, from about 160 to about 230 parts by weight of sand, from about 140 to about 180 parts by weight of gravel and from about 38 to about 50 parts by weight of water. After preparation, these concrete mixes are then allowed to harden to obtain hardened concretes having improved compressive strengths.

For a fuller understanding of this invention, reference may be made to the following examples. These examples are given merely to illustrate the invention and are not to be construed in a limiting sense.

For convenience, the sodium salt of naphthalene sulfonic acid formaldehyde condensate is referred to as "condensate".

EXAMPLE I

Preparation of Naphthalene Sulfonic Acid Formaldehyde Concensate Sodium Salt

To 128 grams of naphthalene (1 mole) were added 120 grams of 98% sulfuric acid (1.2 moles). The mixture was heated to 160° C. and kept at this temperature for 3 hours. The reaction mass was cooled to 95° C. and 170 grams of water and 100 grams of a 37% by weight aqueous solution of formaldehyde (1.23 moles) were added to the resulting sulfonation mixture. The resulting solution was heated to reflux. The mass was held for 30 hours under reflux conditions, then cooled to 60° C. and treated with a suspension of 14 grams lime in 30 grams water. After 24 hours time the product was filtered to remove the precipitated calcium sulfate. The filtered material contains 42% by weight solids as naphthalene sulfonic acid formaldehyde condensate, and had an acid value of 10.9% as $H_2SO_4$.

The resulting product was then converted to its sodium salt by adding 84 grams of a 50% by weight aqueous solution of sodium hydroxide. The pH as is was 9.5.

EXAMPLE II

Preparation of Resorcinol-Formaldehyde Resin 110.0 grams of resorcinol (1 mole) were mixed with 110.0 grams water. The mixture was agitated and heated slowly until a clear solution resulted. Then 55.0 grams of a 36.5% by weight aqueous solution of formaldehyde (0.67 mole) was added and stirred together. Next, 5 grams of 1 normal sulfuric acid solution was added and the entire mixture which was a clear solution was heated gently. When the temperature of the solution reached 30° C., an exothermic reaction started which was controlled with adequate cooling. The temperature was permitted to rise to a maximum of 60° C. After the exothermic reaction subsided, the total mass was heated to reflux temperature which was 101°-102° C. The mass was held under reflux temperature for 1 additional hour.

The reaction was then cooled to 25° C. The formaldehyde titration showed 0% free formaldehyde.

Finally, the material was neutralized to a pH as is of 8.5 with 32 grams of a 45% by weight aqueous solution of sodium hydroxide.

The resulting product was a clear brown solution with the following properties:
Solids: 42% by weight
Viscosity: 30 cps Brookfield spindle No. 1 at 60 RPM, 25° C.
Freezing Point: −10° C.

EXAMPLE III

Preparation of Catechol-Formaldehyde Resin 90.2 grams catechol (0.82 mole) were mixed with 200 grams water. The mixture was agitated and heated slowly until a clear solution resulted. Then 45 grams of a 36% by weight aqueous solution of formaldehyde (0.54 mole) was added with stirring. Next, 5 grams of 1 normal sulfuric acid solution was added and the mixture heated slowly to the reflux point. After refluxing for 3 hours, the reaction mass was then cooled to 25° C. The formaldehyde titration showed 0% free formaldehyde.

The material was neutralized with a 45% by weight aqueous solution of sodium hydroxide to pH of 8.6. The resulting product was a dark brown solution having 29% by weight solids.

EXAMPLE IV

The following additive mixtures were prepared:

A 90.0 parts by weight of product from Example I was mixed with 10.0 parts by weight of product from Example II. The resulting material was a clear, red-brown syrupy liquid with 42% by weight solids and pH as is of 9.3.

B 75.0 parts by weight of product from Example I was mixed with 25.0 parts by weight of product from Example II. The resulting material was a clear, red-brown syrupy liquid with 42% by weight solids and pH as is of 9.1.

C 85.0 parts by weight of product from Example I was mixed with 15.0 parts by weight of product from Example III. The resulting material was a clear dark-brown syrupy liquid with 40% by weight solids and pH as is of 9.3.

D 62.5 parts by weight of product from Example I was mixed with 37.5 parts by weight of product from Example III. The resulting material was a clear dark-brown syrupy liquid with 37% by weight solids and pH as is of 9.2.

EXAMPLE V

This example describes the evaluation of the blends of Example IV, the condensate alone of Example I and a control mix.

A casting mix (casting mix 1) was prepared using 800 parts by weight of cement, 2400 parts by weight of sand and 370 parts by weight of water. The mixture was agitated for 3 minutes, allowed to stand for 3 minutes and mixed again for 2 minutes. This mix is identified as the Control.

To each of five other identical mixes were added 4 parts by weight of one of the four blends of Example IV and the condensate alone of Example I (calculated on a dry basis) to the water.

Another casting mix (casting mix 2) was prepared using 770 parts by weight of cement, 1510 parts by weight of sand, 1150 parts by weight of aggregate and 385 parts by weight of water. This mix is identified as the Control.

To each of five other identical mixes were added 4 parts by weight of one of the four blends of Example IV and the condensate alone of Example I (calculated on a dry basis) to the water.

The slump of all samples was measured according to ASTM standard C 143-74. The air content was checked by the Chaser air indicator.

Specimens for compressive strength testing were 3×6 inch cylinders, consolidated by rodding and cured at 21°–24° C. and at 100% relative humidity. Data were collected based on the average of values obtained from 3 cylinders following ASTM standard C 39-72 after 1, 7 and 28 days.

The results of the tests with the two casting mixes and the different additives are shown in Tables I and II.

TABLE I

Casting Mix No. 1

| Additive | % Air Content | Slump (Inches) | Compressive Strength (psi) 1 day | 7 days | 28 days |
|---|---|---|---|---|---|
| Control | 3.5 | 2½ | 1600 | 2700 | 3400 |
| Ex. I | 4.5 | 1¾ | 2100 | 3400 | 4400 |
| Ex. IV A | 3.5 | 5 | 2500 | 4200 | 5500 |
| % Improvement over Ex. I | | 186 | 19 | 24 | 25 |
| Ex. IV B | 3.5 | 6 | 2400 | 4100 | 5400 |
| % Improvement over Ex. I | | 243 | 14 | 21 | 23 |
| Ex. IV C | 4.0 | 4 | 2350 | 4100 | 5400 |
| % Improvement over Ex. I | | 129 | 12 | 21 | 23 |
| Ex. IV D | 4.0 | 4 | 2300 | 4050 | 5300 |
| % Improvement over Ex. I | | 129 | 10 | 19 | 10 |

TABLE II

Casting Mix No. 2

| Additive | % Air Content | Slump (Inches) | Compressive Strength (psi) 1 day | 7 days | 28 days |
|---|---|---|---|---|---|
| Control | 4.0 | 5 | 1800 | 3300 | 4200 |
| Ex. I | 4.0 | 5 | 3000 | 4100 | 4800 |
| Ex. IV A | 4.0 | 7 | 3500 | 4700 | 6500 |
| % Improvement over Ex. 1 | | 40 | 17 | 15 | 35 |
| Ex. IV B | 3.5 | 7.5 | 3500 | 4800 | 6500 |
| % Improvement over Ex. 1 | | 50 | 17 | 17 | 35 |
| Ex. IV C | 3.0 | 6.5 | 3300 | 4600 | 5800 |
| % Improvement over Ex. 1 | | 30 | 10 | 12 | 21 |
| Ex. IV D | 3.0 | 7.0 | 3200 | 4500 | 5700 |
| % Improvement over Ex. 1 | | 40 | 7 | 10 | 19 |

The results in Tables I and II show a definite improvement regarding both slump and increased compressive strength. Specifically, the increase in both slump and compressive strength over the controls due to the additive mixture is significantly greater than that due to use of the condensate alone.

While the invention has been described with reference to certain specific embodiments thereof, it is understood that it is not to be so limited since alterations and changes may be made therein which are within the full intended scope of the appended claims.

What is claimed is:

1. An additive for cementitious materials comprising:
 (a) at least one salt of naphthalene or lower alkyl substituted naphthalene sulfonic acid formaldehyde condensate and
 (b) at least one water-soluble resin selected from the group consisting of resorcinol-formaldehyde and catechol-formaldehyde resins.

2. The additive of claim 1 wherein said component (a) is present in an amount of about 50% by weight to about 95% by weight and said component (b) is present in an amount of about 5% by weight to about 50% by weight.

3. The additive of claim 2 wherein said component (a) is the sodium salt of naphthalenesulfonic acid formaldehyde condensate.

4. The additive of claim 2 wherein said component (b) is water-soluble resorcinol-formaldehyde resin.

5. The additive of claim 2 wherein said component (b) is water-soluble catechol-formaldehyde resin.

6. A cementitious composition containing the additive of claim 1 in an amount sufficient to enhance workability after water is added and to enhance compressive strength of the hardened material.

7. The cementitious composition of claim 6 wherein said additive is present in an amount of from about 0.05% by weight to about 5% by weight of the cement component.

8. The cementitious composition of claim 6 wherein said additive is composed of (a) from about 50% by weight to about 95% by weight of the sodium salt of naphthalene sulfonic acid formaldehyde condensate and (b) from about 5% by weight to about 50% by weight of at least one water-soluble resin selected from the group consisting of resorcinol-formaldehyde and catechol-formaldehyde resins.

9. The cementitious composition of claim 8 wherein component (b) is water-soluble resorcinol formaldehyde resin.

10. The cementitious composition of claim 8 wherein component (b) is water-soluble catechol-formaldehyde resin.

11. A hardened cementitious composition characterized by enhanced compressive strength prepared from the composition of claim 6.

12. The composition of claim 11 wherein said hardened cementitious composition is concrete.

* * * * *